Dec. 28, 1965
T. SHERWEN
3,225,855
SWIVEL MOUNTINGS FOR FLUID-DRIVEN STEERABLE VEHICLE WHEELS
Filed April 20, 1964
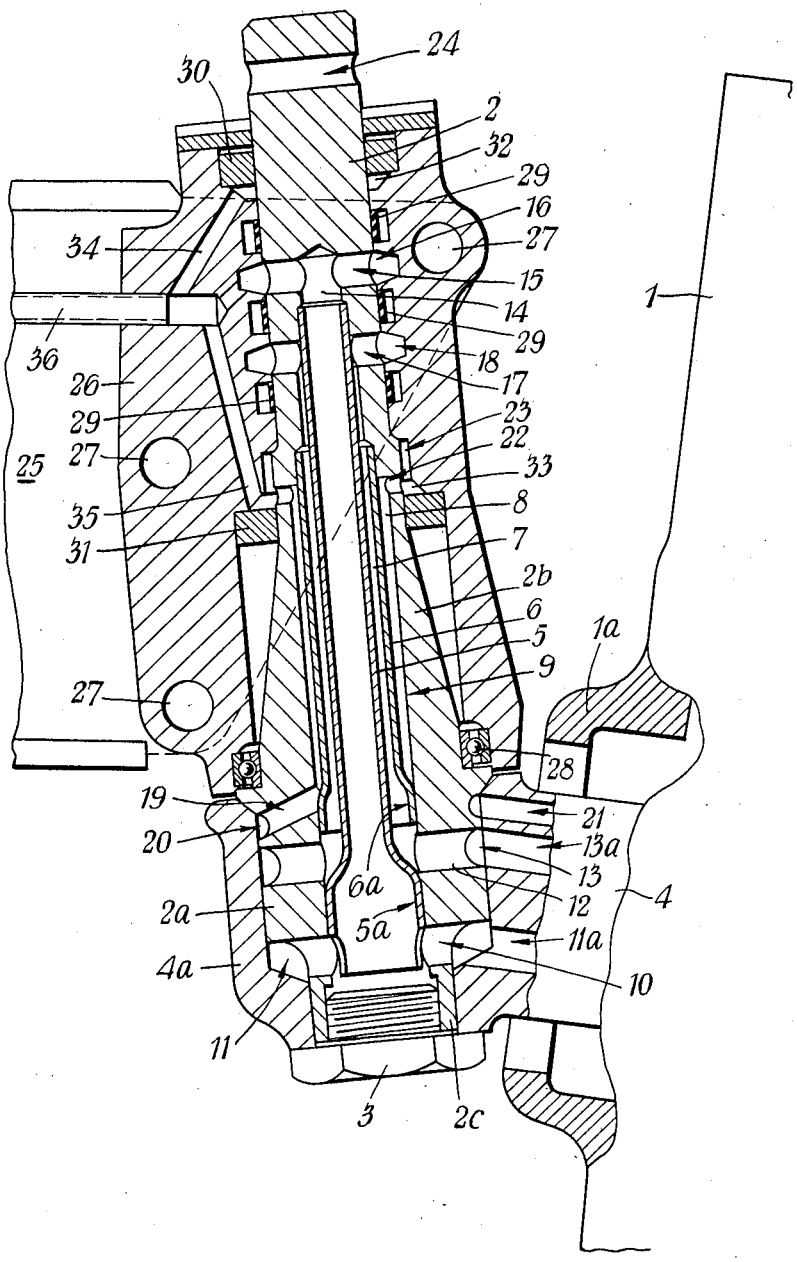

3,225,855
SWIVEL MOUNTINGS FOR FLUID-DRIVEN STEERABLE VEHICLE WHEELS
Theo Sherwen, Gloucestershire, England, assignor to Prime Movers (Wiltshire) Limited, Birmingham, England, a British company
Filed Apr. 20, 1964, Ser. No. 361,057
Claims priority, application Great Britain, Apr. 30, 1963, 17,033/63
6 Claims. (Cl. 180—43)

This invention relates to swivel mountings for steerable vehicle wheels having a hydraulic driving motor built-in to the wheel, and is concerned with improvements in the construction of such mountings.

According to the invention, a swivel mounting for a steerable vehicle wheel with a built-in hydraulic motor includes a kingpin having a head end adapted for attachment to the inner end of a wheel stub axle and a shank end adapted for connection with a steering arm, and a bearing sleeve which is rotatably engaged around the head and shank ends of the latter, and is adapted for attachment to the vehicle chassis, communicating flow passages and separate communicating return passages for hydraulic fluid being provided respectively through the kingpin and bearing sleeve.

In order that the invention may be clearly understood and readily carried into effect, an embodiment thereof will now be described in detail with reference to the accompanying drawing in which the single figure is a part-sectional elevation view showing a swivel mounting of the invention in operative position between one end of a vehicle axle and part of a wheel stub-axle.

Referring now to the drawing, the swivel mounting illustrated is applied to the suspension of a steerable front tractor wheel 1 having a built-in hydraulic driving motor (not shown) which is supplied with hydraulic fluid from a reservoir and pump on the tractor. The mounting incorporates a kingpin 2 having an elongated generally cylindrical body formed with a head end 2a of larger diameter than the opposite shank end and with an intermediate tapering neck part 2b through which the head merges into the shank. At the head end of the kingpin body there is further provided a concentric internally screwthreaded boss extension 2c for receiving a retaining bolt 3 as will be later explained.

To connect the aforesaid kingpin with a stub-axle 4 on which the wheel 1 is carried, the inner end of the stub-axle is provided with an upwardly opening socket 4a having a reduced hole through the base thereof. This socket is internally dimensioned to receive the head 2a of the kingpin which seats head downwardly in the socket with the boss extension 2c projecting into the hole in the socket base. The retaining bolt 3 is screwed into the boss extension through the hole in the socket base and serves to draw the kingpin head 2a firmly into its seated position in which the neck and shank of the kingpin project upwardly from the socket mouth as shown.

For the purpose of providing the kingpin with separate internal flow and return passages for hydraulic fluid, a blind bore is arranged to extend axially through the kingpin from the boss extension, to terminate approximately mid-way along the length of the kingpin shank. Inner and outer conduits 5 and 6 are then arranged concentrically in this bore, the inner or return conduit 5 being extended beyond the outer or flow conduit 6 at each end. The diameters of the two conduits 5 and 6 relatively to each other and to the blind bore are such that an annular flow passage 7 is formed between the two conduits while an annular drain passage 8 is formed between the outer conduit 6 and the wall 9 of the blind bore.

The lower end 5a of the inner or return conduit 5 is arranged, at the head end of the kingpin, to provide a fluid-tight connection, through radial ports 10, with an annular fluid return channel 11 which is formed externally around the head of the kingpin adjacent the boss extension. Similarly, the lower end 6a of the outer conduit is arranged in fluid-tight connection, through radial ports 12, with an annular fluid flow channel 13 which is also formed externally around the head of the kingpin at a location inset from the return channel. The flow and return channels around the head of the kingpin are arranged to register respectively with flow and return bores 13a and 11a which are formed axially through the stub-axle 4 and which are connectible, through a distribution valve (not shown), with the cylinders of a hydraulic motor built-in to the wheel hub 1a when the wheel is assembled on the stub-axle.

The upper end of the inner or return conduit 5 terminates adjacent the inner end of the blind bore through the kingpin in a bore portion 14 of reduced diameter. The upper return conduit end thence communicates through the innermost end of the blind bore with return ports 15 opening radially through the kingpin shank into an annular return channel 16 around the shank approximately mid-way along the shank length. Similarly, the annular flow passage 7 formed between the inner and outer conduits 5 and 6 is arranged to communicate, at the upper end, in a substantially fluid-tight manner, with radial ports 17 opening through the kingpin shank into an annular flow channel 18 around the shank at a location which is axially inset from the return channel.

The annular drain passage 8 which is formed between the outer flow conduit 6 and the wall 9 of the blind bore is arranged to connect, at the lower end, through substantially radial port means 19, with an annular drainage channel 20 which is formed externally around the periphery of the kingpin head. This annular drainage channel 20 is arranged to register with a drainage bore 21 which is formed through the stub-axle for connection with the hydraulic motor. At the upper end, the annular drain passage 8 through the kingpin opens through radial ports 22 into an annular drainage channel 23 formed externally around the kingpin at the junction of the shank and tapered portions of the latter.

The kingpin shank at the uppermost end extending beyond the inner end of the blind bore is made solid. A diametral hole 24 is formed through the solid shank end, near the uppermost extremity, for connection with the steering arm (not shown) by a key, cotter, bolt or the like.

To attach the kingpin as described to a vehicle axle 25, the swivel mounting further incorporates a bearing sleeve 26 which is provided with holes 27 for receiving attachment bolts whereby the bearing sleeve is bolted to one end of the axle 25 in a generally upright or slightly inclined position. The sleeve 26 is open at each end and is internally dimensioned to fit over the shank and tapered parts of the kingpin which project upwardly from the stub-axle socket as aforesaid. The internal diameter of the sleeve at the upper sleeve end is such that the kingpin shank rotatably fits therein, whilst the internal sleeve diameter at the lower end surrounding the tapered portion of the kingpin is made somewhat oversize in relation to the kingpin. At its lowermost end, the bearing sleeve is arranged to seat upon an annular race forming part of a main thrust ball bearing 28 which is located on an external shoulder provided around the kingpin at the junction of the head and tapered parts adjacent the socket mouth. When thus seated, the axial dimension of the bearing sleeve 26 is such that the upper extremity of the kingpin shank projects slightly above the upper sleeve end for connection with the steering arm as aforesaid.

The annular fluid return and flow channels 16 and 18 around the kingpin shank are arranged to register respectively with return and flow passages (not shown) provided through the wall of the bearing sleeve. At their outer ends these passages through the bearing sleeve are arranged to connect with hydraulic fluid return and flow conduits extending along or through the axle to connect with the hydraulic pump and reservoir mounted on the vehicle.

To inhibit leakage between the return and flow channels 16 and 18 and the respective passages in the bearing sleeve, three sealing rings 29 are provided in recesses around the bore of the sleeve which encircles the kingpin shank. These rings are located so that one lies below the annular flow channel 18 around the kingpin shank, one lies above the annular return channel 16 and one lies between the aforesaid channels. Further drain seals are provided around the kingpin shank, one such seal 30 being located around the shank adjacent the upper sleeve end and the other such seal 31 around the shank at the junction thereof with the tapered portion of the kingpin. Inset from these drain seals are provided drain recesses 32 and 33 which communicate through drain passages 34 and 35 in the wall of the bearing sleeve with a drain line 36 which extends along the axle 25 back to the reservoir. This drain line is also connected with the annular drain channel 23 around the upper end of the annular drain passage 8 which connects back to the motor.

With the arrangement described, it will be appreciated that, by mounting the bearing sleeve on the vehicle axle as aforesaid, and attaching the head end of the kingpin in the stub-axle socket, the kingpin and stub-axle, which latter carries the wheel in the usual manner, will be free to swivel in the bearing sleeve in response to steering movements applied to the upper end of the kingpin. At the same time, flow and return conduits for hydraulic fluid operating the driving motor built-in to the wheel extend through the mounting and will not interfere with the aforesaid steering movements. The references throughout the foregoing to "flow" and "return" conduits, passages, channels, ports and the like are, of course, to facilitate description. In fact, the flow and return lines through the equipment are reversible for opposite drive directions and for left- and right-hand motors.

I claim:

1. A swivel mounting for a steerable vehicle wheel having a built in hydraulic motor, said mounting including: a kingpin having a head adapted for attachment to the inner end of a wheel stub-axle and a shank adapted for connection with a steering arm; a bearing sleeve engaged around the kingpin between the head and shank of the latter so that the kingpin is rotatable with respect to the bearing sleeve, said bearing sleeve being attachable to the vehicle chassis; the kingpin being generally cylindrical in form, the head thereof being of larger diameter than the shank thereof; means defining a tapering neck connecting said head to said shank; means providing communicating flow passages and separate communicating return passages for hydraulic fluid respectively through the kingpin and bearing sleeve, and means providing communicating drain passages through the kingpin and sleeve; the communication between the flow, return and drain passages being effected through annular channels provided around the kingpin, said annular channels being axially spaced along the kingpin and made fluid-tight by sealing rings which encircle the kingpin; the bearing sleeve peripherally surrounding at least portions of the shank and tapering neck of the kingpin, said bearing sleeve being oversize in relation to said tapering neck and having a lower end seated on a thrust bearing carried on an external shoulder formed about the kingpin.

2. A swivel mounting as claimed in claim 1 wherein the upper extremity of the kingpin shank projects through the extent of the bearing sleeve and additionally comprising means defining a generally transversely extending securement receiving means on said projecting shank extremity for connecting said kingpin with a steering arm; and a further sealing ring being provided around the kingpin shank adjacent the upper extent of the bearing sleeve.

3. A swivel mounting as claimed in claim 1 wherein the flow, return and drain passages extend axially through the kingpin in concentric relationship.

4. A swivel mounting for a steerable vehicle wheel having a built-in hydraulic motor, said mounting including a kingpin having a head adapted for attachment to the inner end of a wheel stub-axle and a shank adapted for connection with a steering arm; a bearing sleeve engaged around the kingpin between the head and shank of the latter so that the kingpin is rotatable with respect to the bearing sleeve, said bearing sleeve being attachable to the vehicle chassis; the kingpin being generally cylindrical in form, the head thereof being of larger diameter than the shank thereof; means defining a tapering neck connecting said head to said shank; means providing communicating flow passages and separate communicating return passages for hydraulic fluid respectively through the kingpin and bearing sleeve, and means providing communicating drain passages through the kingpin and sleeve; the communication between the flow, return and drain passages being effected through annular channels provided around the kingpin, said annular channels being axially spaced along the kingpin and made fluid tight by sealing rings which encircle the kingpin; and additionally comprising means defining an upwardly opening socket at the inner end of said stub-axle dimensioned internally to fit over the head of the kingpin, said kingpin being seated head downwardly in the socket.

5. A swivel mounting as claimed in claim 4 additionally including a concentric internally screw-threaded boss extension on the head of the kingpin; means defining an opening in the socket base said boss extension being received in said opening; and a retaining bolt screwed into the boss extension through said opening to draw the kingpin head firmly into a seated position.

6. A swivel mounting as claimed in claim 5 wherein the flow, return and drain passages through the kingpin open into annular channels around the kingpin head which connect with corresponding passages through the stub-axle.

References Cited by the Examiner

UNITED STATES PATENTS

| | | | |
|---|---|---|---|
| 1,026,662 | 5/1912 | Eisner | 180—66 X |
| 1,242,033 | 10/1917 | Painter et al. | |
| 1,312,733 | 8/1919 | Ingram | 280—96.2 |
| 1,803,932 | 5/1931 | Dooley. | |
| 1,981,802 | 11/1934 | Gleason | 280—96.1 X |
| 2,027,366 | 1/1936 | Bijur | 280—96.1 X |
| 2,209,804 | 1/1940 | Ashley | 280—96.1 X |
| 2,430,528 | 11/1947 | Moon | 180—66 X |
| 2,567,144 | 9/1951 | Butterfield | 280—96.2 |
| 3,008,424 | 11/1961 | Roth | 180—66 X |
| 3,067,831 | 11/1962 | Willock | 180—52 X |

KENNETH H. BETTS, *Primary Examiner.*